Oct. 8, 1935.  F. G. GRANTHAM  2,016,777
LAWN MOWER SHARPENER
Filed Feb. 24, 1934
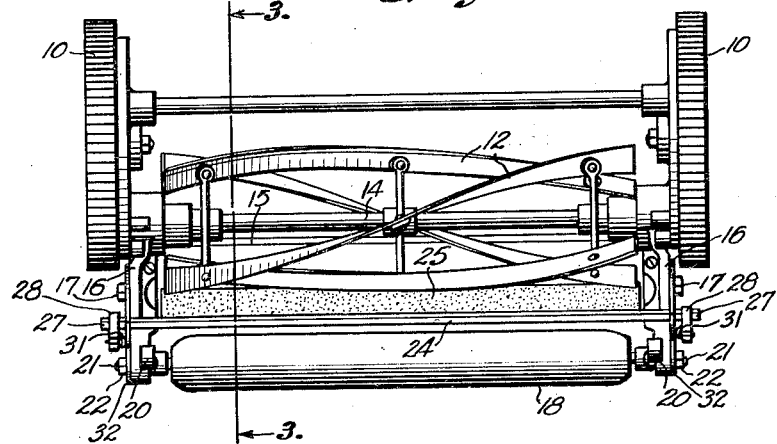
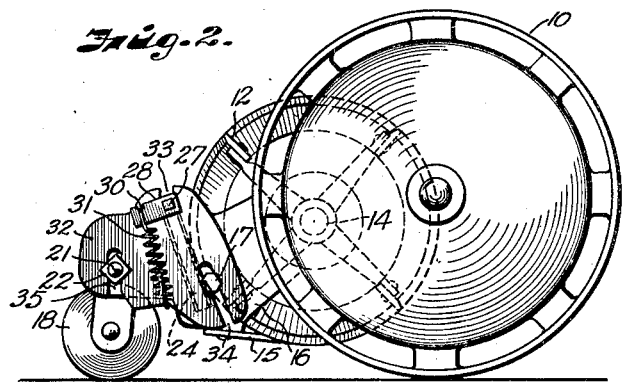
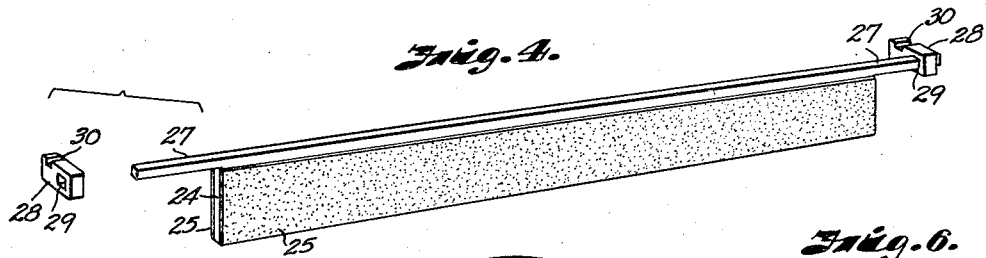
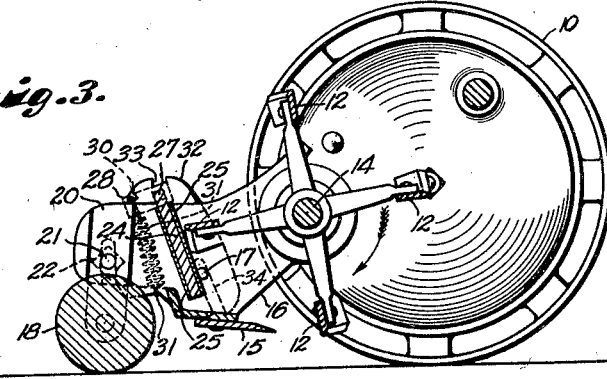
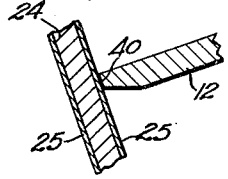
INVENTOR:
F. G. Grantham,
By Chas. W. Girard
ATTORNEY.

Patented Oct. 8, 1935

2,016,777

UNITED STATES PATENT OFFICE 2,016,777

LAWN MOWER SHARPENER

Frederick G. Grantham, Kansas City, Mo.

Application February 24, 1934, Serial No. 712,775

5 Claims. (Cl. 51—250)

The present invention relates to sharpening means for lawn mowing apparatus, and the primary object in view is to devise an appliance which may be readily mounted on such apparatus in a manner whereby an ordinary operation of the mower will effect a self-sharpening action for restoring the proper bevel on the cutting blades.

For this purpose I provide an abrading member for producing the sharpening action, together with means for mounting said member in such operative relation to the mowing blades as to effect the proper beveling of the blades during the rotative movement thereof in the forward travel of the machine. In this connection it is an important object of the invention to provide a supporting means for the abrading member which will be adapted to be readily applied to the usual type of lawnmower, and including provision for carrying out the necessary adjustments for the proper positioning of the abrading member with relation to the rotating blades.

It is also an object of the invention to devise a construction of this character in which the supporting means for the abrading member may be readily incorporated with the mowing apparatus itself as a standard part of the mower, and in which the mounting of the abrading member will automatically assume the proper position without other adjustment.

With the foregoing general objects in view, the invention will now be described by reference to the accompanying drawing illustrating a practical form of embodiment of the proposed improvements, after which those features and combination deemed to be novel and patentable will be particularly set forth and claimed.

In the drawing—

Figure 1 is a plan view of a lawnmower with its operating handle omitted, and showing an abrading member and supporting or positioning means embodying the present invention;

Figure 2 is a side view of the same;

Figure 3 is a transverse sectional view, representing a section taken on the line 3—3 of Figure 1;

Figure 4 is a perspective view of the abrading member with its spring-attaching arms (one of the latter being shown in detached relation);

Figure 5 is a perspective view of one of the supporting plates for the abrading member; and Figure 6 is an enlarged detail view showing the operative relation between the abrading member and one of the mower blades.

Referring now to the drawing in detail, this illustrates the improved sharpening means as applied to a lawnmower of conventional construction comprising the usual wheels 10 for operating the cutting reel made up of a plurality of curved blades 12 rotating about the shaft 14 for cooperating with a fixed blade 15 which is mounted for adjustment in the usual way between end frames 16 having bolts 17 representing the axis of said adjustment. The usual roller 18 is mounted between the end frames, being carried by adjustable frame pieces 20 which are clamped by means of bolts 21 and nuts 22.

For the sharpening appliance comprising the present invention, I provide an abrading or grinding member in the form of a rigid plate 24 of any suitable metallic material, to the opposite faces of which are applied sheets or strips 25 of suitable abrasive material, which are preferably glued securely and evenly to the surfaces of the plate 24 (Figures 3 and 4). The upper corners of the plate 24 are formed with oppositely extending arms 27 whereby the plate is suspended in operative position; these arms are shown as of rectangular cross-section for the removable attachment of a pair of spring-attaching elements 28 having squared openings 29 for engaging the arms 27, and notches 30 for the attachment of suitable coil springs 31, as clearly indicated in Figure 2. For the mounting of the abrading member in operative position, I have shown a pair of plate or bracket elements 32 formed with a plurality of open-ended slots or notches (see Figure 5), including slots 33 for receiving the arms 27 of the abrading member, and slots 34 and 35 for engagement with the bolts 17 and 21, respectively, whereby said bracket elements are secured in fixed position after adjustment by the tightening of the bolts 17 and nuts 22, as represented in Figures 1 and 2. The elements 28 project rearwardly from the upper margin of the abrading member so that when the lower ends of the springs 31 are hooked under tension to the lower edges of the bracket elements 32, the spring action is such as to impart a yielding upward and forward swing to the abrading member into the path of movement of the blades 12; moreover, the bracket elements 32 have sufficient play with reference to their securing bolts 17 and 21 to permit appropriate adjustment of the abrading member and its supporting assembly for bringing the abrading surface substantially flush with the desired bevel surface 40 to be produced upon the cutting edges of the blade (as indicated in Figure 6).

With this construction, and the parts thereof duly assembled in the relation illustrated in the drawing, and the abrading member properly adjusted as above described, the abrading or grinding operation is carried out for sharpening the blades by the simple expedient of pushing the mower forwardly as in the ordinary operation of the machine, whereby the sharpening operation is automatically produced by the mere forward travel of the machine, which effects rotation of the cutting reel in the direction of the arrow (Figure 3), which is accompanied by a wiping action of the bevel surfaces 40 of the blades across the abrading surface 26, during which action the necessary tension between the blades and abrading member is maintained by the combined action of the springs 31, as will be readily understood. Any further adjustment which may become necessary is secured by loosening of the attaching bolts 17 and 21 and tightening thereof after appropriate shifting of the bracket elements 32. After the blades have been thus sharpened by a short distance of travel of the machine, the abrading member is detached and removed, leaving only the plates or brackets 32 on the machine during the mowing operation. The construction provides not only for quick and convenient assembly or removal of the sharpening means from the mower, but also for reversal of the operative position of the abrading member, thereby enabling the opposite faces of the latter to be presented into grinding relation to the blades, as where the plate 24 is provided with abrasive material 25 of different degrees of fineness on its opposite faces, so that the coarser grade may be employed first and then followed by finer grinding with the other side of the abrading member. This abrading material may of course be readily removed from time to time as the same becomes worn, by simply replacing the worn strips with fresh material.

From the foregoing it will be apparent that I have devised a practical and efficient sharpening means for carrying out the desired objects of the invention, and while I have illustrated and described a suitable and entirely satisfactory form of embodiment of the same, it will be obvious that various modifications are possible within the spirit of what I deem to be the scope of my invention; for example, the spring-attaching elements may, if preferred, be simply made as angular terminals of the arms 27 of the abrading member, if only one abrading surface is required; and if the sharpening device should be adopted as standard equipment for a given manufacture of mower, the bracket plates 32 may of course be eliminated and the notches 33 for mounting the abrading member provided directly in the end frames 16 themselves, since no further adjustment will ordinarily be required where the appliance is incorporated originally as part of the machine, thereby effecting a permanent adjustment as to this feature. I therefore desire to be understood as reserving the right to make whatever changes or modifications may fairly fall within the scope of the appended claims.

Having described my invention, what I claim to be new and desire to secure by Letters-Patent is:

1. Sharpening means for lawnmowers having rotating blades, comprising a plate provided with an abrading surface, the upper corners of said plate being provided with supporting arms, means engaged by said arms for suspending said plate with its abrading surface in position for wiping engagement with the mower blades, and spring means engaging said arms and yieldingly actuating said plate into the path of movement of said blades.

2. Sharpening means for lawnmowers having rotating blades, comprising a plate provided with an abrading surface, the opposite ends of said plate being provided with supporting arms, bracket elements removably clamped to the frame of the mower and providing bearings for said arms whereby said plate is suspended with its abrading surface in position for engagement with the mower blades, and spring means engaging said arms and yieldingly actuating said plate into the path of movement of said blades.

3. Sharpening means for lawnmowers having rotating blades, comprising a plate provided with an abrading surface, the opposite ends of said plate being formed with supporting arms, bracket elements adjustably secured to the frame of the mower and provided with bearing apertures for accommodating said arms and thereby supporting said plate with its abrading surface in position for engagement with the mower blades, and spring means engaging said arms and yieldingly actuating said plate into the path of movement of said blades.

4. Sharpening means for lawnmowers having rotating blades, comprising a plate having its opposite faces provided with abrading material, the opposite ends of said plate being provided with supporting arms, means removably engaging said arms for supporting said plate with said abrading material in position for wiping engagement with the mower blades, and spring means removably engaging said arms for yieldingly actuating said plate into the path of movement of said blades, whereby said plate may be reversed in its operative position for presenting either of its faces in abrading relation.

5. Sharpening means for lawnmowers having rotating blades, comprising a plate formed with supporting arms at its opposite ends and having its opposite faces provided with abrading material, supporting means attached to the mower and providing bearings for removable engagement with said arms whereby said plate is supported with its abrading material in position for wiping engagement with the mower blades, spring attaching elements removably engaging said arms and extending in angular relation thereto, and springs connected with said attaching elements for yieldingly actuating said plate into the path of movement of said blades, whereby said plate may be reversed in its operative position for presenting either of its faces in abrading relation.

FREDERICK G. GRANTHAM.